US012607851B2

(12) United States Patent
Rutz et al.

(10) Patent No.: US 12,607,851 B2
(45) Date of Patent: Apr. 21, 2026

(54) METHOD FOR CALIBRATING, IN AN AUTOMATED MANNER, A VIRTUAL RETINAL SCAN DISPLAY FOR A PAIR OF SMART GLASSES, CALIBRATION DEVICE, AND VIRTUAL RETINAL SCAN DISPLAY

(71) Applicant: Robert Bosch GmbH, Stuttgart (DE)

(72) Inventors: Maximilian Rutz, Tuebingen (DE);
Christian Nitschke, Kusterdingen
(DE); Henning Kaestner, Reutlingen
(DE); Jens Weber, Dusslingen (DE);
Julian Heinzelmann, Dettingen (DE);
Simon Pick, Tuebingen (DE)

(73) Assignee: ROBERT BOSCH GMBH, Stuttgart
(DE)

( * ) Notice: Subject to any disclaimer, the term of this
patent is extended or adjusted under 35
U.S.C. 154(b) by 0 days.

(21) Appl. No.: 18/857,285

(22) PCT Filed: Jun. 12, 2023

(86) PCT No.: PCT/EP2023/065568
§ 371 (c)(1),
(2) Date: Oct. 16, 2024

(87) PCT Pub. No.: WO2024/022664
PCT Pub. Date: Feb. 1, 2024

(65) Prior Publication Data
US 2025/0284125 A1 Sep. 11, 2025

(30) Foreign Application Priority Data
Jul. 28, 2022 (DE) ..................... 10 2022 207 774.1

(51) Int. Cl.
*G02B 27/01* (2006.01)

(52) U.S. Cl.
CPC .... *G02B 27/017* (2013.01); *G02B 2027/0178*
(2013.01); *G02B 2027/0198* (2013.01)

(58) Field of Classification Search
CPC .......... G02B 27/017; G02B 2027/0178; G02B
2027/0198
See application file for complete search history.

(56) References Cited

U.S. PATENT DOCUMENTS

| | | |
|---|---|---|
| 9,846,307 B2 | 12/2017 | Tremblay et al. |
| 11,073,689 B2 | 7/2021 | Urquhart et al. |

(Continued)

FOREIGN PATENT DOCUMENTS

| | | |
|---|---|---|
| CN | 107357038 A | 11/2017 |
| DE | 102017200101 A1 | 7/2017 |
| WO | 2022152437 A1 | 7/2022 |

OTHER PUBLICATIONS

Cutolo et al. "Off-Line Camera-Based Calibration for Optical
See-Through Head-Mounted Displays," Applied Sciences vol. 10
(2020); pp. 1-19.

(Continued)

*Primary Examiner* — Matthew A Eason
*Assistant Examiner* — Chayce R Bibbee
(74) *Attorney, Agent, or Firm* — NORTON ROSE
FULBRIGHT US LLP

(57) ABSTRACT

A method for calibrating, in an at least largely automatic
manner, a virtual retinal scan display for a pair of smart
glasses including multiple exit pupils that are spaced apart
from one another, in particular without overlapping, in a
provided pupil plane of the virtual retinal scan display. In at
least one calibration step, an eye-like camera is automati-
cally translated and/or rotated in the provided pupil plane of
the virtual retinal scan display in such a way that at least two
exit pupils of the virtual retinal scan display, preferably all (Continued)

exit pupils of the virtual retinal scan display, are each sequentially captured from different positions and/or angles of the eye-like camera.

10 Claims, 7 Drawing Sheets

(56) References Cited

U.S. PATENT DOCUMENTS

| | | | |
|---|---|---|---|
| 2017/0161951 A1* | 6/2017 | Fix ........................... | G09G 5/00 |
| 2020/0033595 A1* | 1/2020 | Stegelmeier ....... | G02B 27/0081 |
| 2020/0073119 A1* | 3/2020 | Urquhart ............. | G02B 27/017 |

OTHER PUBLICATIONS

Owen et al. "Display-Relative Calibration for Optical See-Through Head-Mounted Displays," Proceedings of Third IEEE and ACM International Symposium on Mixed Augmented Reality (2004); pp. 1-9.
Lee et al. "A Robust Camera-based Method for Optical Distortion of Calibration of Head-Mounted Displays," IEEE Virtual Reality (2013); pp. 27-30.
Gilson et al. "Spatial calibration of an optical see-through head mounted display," Journal of Neuroscience Methods, 173(1) (2010); pp. 1-19.
International Search Report for PCT/EP2023/065568, Issued Sep. 11, 2023.

* cited by examiner

26

38

36

94

44

44

METHOD FOR CALIBRATING, IN AN AUTOMATED MANNER, A VIRTUAL RETINAL SCAN DISPLAY FOR A PAIR OF SMART GLASSES, CALIBRATION DEVICE, AND VIRTUAL RETINAL SCAN DISPLAY

BACKGROUND INFORMATION

A method for manually calibrating a virtual retinal scan display for a pair of smart glasses, comprising multiple exit pupils that are spaced apart from one another in a provided pupil plane of the virtual retinal scan display is described in U.S. Pat. No. 11,073,689 B2.

SUMMARY

The present invention proceeds from a method for calibrating, in an at least largely automated manner, a virtual retinal scan display for a pair of smart glasses, comprising multiple exit pupils (eyeboxes) that are spaced apart from one another, in particular without overlapping, in a provided pupil plane of the virtual retinal scan display.

According to an example embodiment of the present invention, it is provided that, in at least one calibration step, an eye-like camera is automatically translated and/or rotated in the provided pupil plane of the virtual retinal scan display in such a way that at least two exit pupils of the virtual retinal scan display, preferably all exit pupils of the virtual retinal scan display, are each sequentially captured from different positions and/or angles of the eye-like camera. In particular despite the complexity of the task, the provided method of the present invention makes it possible to calibrate large numbers of virtual retinal scan displays in a short time, in particular by advantageously making automation of the calibration method possible. Advantageously, a determination of different parameters of the virtual retinal scan display can be simplified, accelerated and/or automated by the method according to the present invention. This inter alia includes automated determination of positions of exit pupils in the pupil plane and/or automated determination and/or correction of brightness profiles within exit pupils and/or between exit pupils.

In particular, the term "pair of smart glasses" is understood to mean a wearable (head-mounted display), by means of which information can be added to the field of view of a user. Preferably, smart glasses make augmented reality applications and/or mixed reality applications possible. Smart glasses are also commonly referred to as data glasses. In particular, the pair of data glasses comprises a virtual retinal scan display (also known as a light field display), in particular one generally conventional to a person skilled in the art. In particular, the virtual retinal scan display is configured to sequentially scan image content by deflecting at least one light beam, in particular a laser beam, from at least one time-modulated light source, such as one or more laser diodes of a laser projector, and to image it directly onto the retina of the user eye by means of optical elements. The image source is in particular designed as an electronic image source, for example a graphics output, in particular an (integrated) graphics card, a computer or processor, or the like. The image data are in particular formed as color image data, e.g., RGB image data. In particular, the image data may be designed as still or moving images, e.g., videos. In particular, the virtual retinal scan display comprises a (miniaturized) laser projector. The laser projector or an optical system downstream of the laser projector can be configured to output the image in multiple exit pupils that are spaced apart from one another at least in the pupil plane of the virtual retinal scan display. For example, beam splitters, segmented holographic-optical elements or segmented lenses can be used, which split and/or multiply an originally common beam. Each image in each exit pupil can be modified individually so that, for a uniform image perception by a user of the virtual retinal scan display, an adjustment of the exit pupils, i.e., in particular a calibration of the individual exit pupils, is necessary. On the basis of the calibration results of the method according to the present invention, an output of the laser projector is modified in such a way that the images perceptible in the individual exit pupils are at least substantially harmonized. Based on the captures from different positions and/or angles of the eye-like camera, a correction of the respective parameter to be calibrated for the output of the laser projector in the individual exit pupils, such as a surface brightness in the individual exit pupils or a geometric distortion in the individual exit pupils, is subsequently calculated and/or performed.

An "eye-like camera" is in particular understood to mean a digital camera that captures angle of views similar to at least the human eye and/or that has at least one optical function similar to the human eye. In particular, the eye-like camera is designed as a camera that is explicitly and deliberately based on the human eye. In particular, the eye-like camera is designed as a camera that explicitly and deliberately records an image of an environment as it would also be perceived by a human eye, in particular with respect to a field of view and/or viewing angle.

In particular, when the eye-like camera is positioned relative to the virtual retinal scan display at a location where the human eye would otherwise be positioned, only a maximum of exactly one exit pupil is always arranged in the field of view of the eye-like camera in each case. The provided pupil plane is designed in particular as a surface (plane) of the virtual retinal scan display, preferably of the pair of smart glasses, in which plane the pupils of an eye of the user of the virtual retinal scan display are approximately (ideally) located when the virtual retinal scan display is used by the user. In particular, the provided pupil plane is approximately parallel to a surface of a lens of the pair of smart glasses. The term "sequential" capture is in particular understood to mean capturing the individual exit pupils in chronological succession. The configuration of the camera as an eye-like camera makes it impossible to simultaneously capture two or more exit pupils in the provided pupil plane of the respective virtual retinal scan display. In particular, the eye-like camera is moved (axis of translation) and/or rotated (axis of rotation) by means of motorized axes in the calibration step. In particular, the different positions are adjusted by means of the axis/axes of translation. In particular, the different angles are adjusted by means of the axis/axes of rotation. In particular, the axes of translation and the axes of rotation are used to move the eye-like camera in such a way that the images of each exit pupil are each detected from different perspectives. In particular, the axes of translation and the axes of rotation are used to move the eye-like camera in such a way that the images of each exit pupil are each detected from different angles and/or from different perspectives.

An "exit pupil" is in particular understood to mean an image-side image of a (virtual) aperture diaphragm of those optical components of an optical system of the virtual retinal scan display that generate the image of the image content. In particular, when the virtual retinal scan display is used as intended, at least one of the exit pupils of the virtual retinal scan display overlaps with an entry pupil of the user eye. The terms "provided" and/or "configured" are in particular understood to mean specifically programmed, designed, and/or equipped. An object being provided and/or configured for a particular function is in particular understood to mean that the object fulfills and/or performs this particular function in at least one application state and/or operating state.

If the eye-like camera has an angle of view and an optical function that are similar to those of the human eye, and only a single exit pupil of the virtual retinal scan display, in particular within the provided pupil plane, is thus always captured by the eye-like camera during the calibration step, a calibration based on a real visual impression can advantageously be performed. A particularly advantageous, in particular particularly precise and/or reliable, calibration can thereby be achieved. In addition, each individual exit pupil can advantageously be calibrated separately. It is also advantageously possible to adjust multiple different exit pupils to one another. A parameter of the eye-like camera being "substantially equal" to the same parameter of a human eye is in particular understood to mean that a deviation of the two parameters is less than 30%, preferably less than 15%, and preferably less than 5%.

According to an example embodiment of the present invention, it is furthermore proposed that, in at least one method step, in particular chronologically preceding the calibration step, the positions and/or the sizes of the exit pupils, in particular in the provided pupil plane, of the virtual retinal scan display are ascertained by moving the eye-like camera, for example in strips, over the entire projection area of the virtual retinal scan display and determining the position of the respective exit pupil in a coordinate system of the eye-like camera by sequentially recording test patterns from each exit pupil, or by simultaneously recording the entire projection area of the virtual retinal scan display by means of a further optical sensor, for example a further camera with a large angle of view, a beam profiler or a telecentric camera. As a result, reliable calibration can advantageously be ensured, in particular in that all exit pupils of the particular virtual retinal scan display can be reliably recognized and also subsequently calibrated. Reliable automation of the calibration method can advantageously be made possible. In particular, the virtual retinal scan display in the method step (regardless of which of the two options is used) projects a full-area white image into the entire projection area of all exit pupils.

According to an example embodiment of the present invention, when the eye-like camera is used to carry out the method step in which the positions and/or the sizes of the exit pupils are ascertained, the individual exit pupils enter and exit the field of view of the eye-like camera one after the other as the eye-like camera moves over the projection area, for example in strips. During the movement of the eye-like camera, an image can be recorded by the eye-like camera at regular intervals. The pixel values of these images then preferably result in a brightness profile, which can be mapped to the movement of the eye-like camera, in particular since the exit pupils are fully illuminated during the method step. By knowing the respective positions of the eye-like camera, the positions of the exit pupils and/or the sizes of the exit pupils can then be ascertained therefrom. When using the further optical sensor to carry out the method step in which the positions and/or the sizes of the exit pupils are ascertained, the entire projection area with all exit pupils is recorded at once. In particular, if the further optical sensor has been calibrated accordingly beforehand, the position and/or the size of each individual exit pupil of the entire projection area can be ascertained from this one recording. For this calibration, the position of the further sensor, the optical properties of the further sensor as well as the optical properties of the eye-like camera must be taken into account, preferably in order to ascertain the positions of the exit pupils in the reference system of the subsequently used eye-like camera. The beam profiler is in particular designed as a laser beam profiler. The beam profiler is in particular designed as a device which is configured to capture a spatial intensity profile of a light beam, e.g., a laser beam or a scanned laser beam, in a particular plane transverse to a beam propagation path of the light beam. A telecentric camera is in particular designed as a camera comprising an objective which is characterized in that an entry pupil of the objective and/or the exit pupil of the objective is at infinity.

According to an example embodiment of the present invention, in the method step, if the eye-like camera is rotated, in particular about an axis of rotation extending at least substantially perpendicularly to a main viewing direction of the eye-like camera, so that different angular orientations of the eye-like camera are scanned, high-resolution eye-like cameras with even smaller viewing angles can advantageously be used. Advantageously, different angular orientations of the eye-like camera are thereby scanned during the movement of the eye-like camera.

According to an example embodiment of the present invention, it is furthermore proposed that, in at least one substep of the calibration step, geometric distortions of the individual exit pupils of the virtual retinal scan display are determined by positioning the eye-like camera at ascertained or at, in particular multiple different, defined positions and angles in the provided pupil plane of the virtual retinal scan display and by the thus oriented eye-like camera recording test patterns projected into the exit pupils. As a result, a geometric calibration of multiple exit pupils can advantageously be made possible particularly quickly and reliably, in particular by making automation of the geometric calibration of multiple exit pupils possible. In particular, a correction of the projection in the individual exit pupils is subsequently calculated and/or performed based on the captured distortions (from one or more perspectives). In particular, the pair of smart glasses and/or the virtual retinal scan display comprises a computing unit, which is provided at least for carrying out the correction calculations performed in the calibration step and/or a substep of the calibration step. The term "computing unit" is in particular understood to mean a unit with an information input, information processing, and an information output.

Advantageously, the computing unit comprises at least one processor, a memory, input and output means, further electrical components, an operating program, regulating routines, control routines, and/or calculation routines. The components of the computing unit are preferably arranged on a common printed circuit board and/or are advantageously arranged in a common housing, for example within the pair of smart glasses.

Alternatively, according to an example embodiment of the present invention, it is possible that the computing unit is outsourced, e.g., in a cloud or in a smartphone, etc., and is provided for communication with the pair of smart glasses, in particular at least with a controller of the laser projector. Conventional methods, for example software methods, can be used to determine and calculate the geometric corrections (distortion corrections), in particular for each exit pupil individually. For example, see the following papers in this regard: a) Lee, S., & Hua, H. (2013); "A robust camera-based method for optical distortion calibration of head-mounted displays;" Proceedings—IEEE Virtual Reality, 27-30. b) Gilson, S. J., Fitzgibbon, A. W., & Glennerster, A. (2008); "Spatial calibration of an optical see-through head-mounted display;" Journal of Neuroscience Methods, 173 (1), 140-146. c) Owen, C. B., Zhou, J., Tang, A., & Xiao, F. (2004); "Display-Relative Calibration for Optical See—Through Head-Mounted Displays;" Proceedings of the Third IEEE and ACM International Symposium on Mixed and Augmented Reality (ISMAR 2004) or d) German Patent Application No. DE 10 2017 200 101 A1. In particular, test patterns for each color (e.g., RGB) are projected into each exit pupil in the substep of the calibration step in order to be able to correct color-specific distortions.

If the test patterns projected into the exit pupils by the virtual retinal scan display are composed, in particular digitally, of individual partial patterns projected in chronological succession by the virtual retinal scan display and recorded in chronological succession by the eye-like camera, an optical quality of the test patterns can advantageously be improved, thereby significantly improving a calibration result. Advantageously, optical interference effects, e.g., scattered light, in particular from adjacent subareas of a test pattern, can be avoided within an exit pupil by the proposed chronologically sequential projection of partial patterns. Advantageously, in the case of a test pattern designed as a grid, an interfering influence of adjacent lines on a grid line can be avoided, which can be the case with a simultaneous projection of an entire grid (in the case of grid patterns, for example, adjacent grid lines can influence one another since the intensity profiles of each individual projected grid line of the test pattern projected as an entire grid are often not completely sharply defined rectangular functions). This also makes it advantageously possible to ascertain an optimal exposure time for each line of the test pattern designed as a grid, for example by statistically evaluating the pixel values of the images (recognition of saturated pixels) and, based thereon, iteratively adjusting the exposure times. In this case, the exposure times can, for example, be adjusted such that the test pattern designed as a grid has a homogeneous brightness, which may not always be the case with a single recording of an entire grid due to brightness gradients.

According to an example embodiment of the present invention, it is also provided that, in at least one, in particular further, substep of the calibration step, full-area, in particular homogeneously monochrome, images are projected into the exit pupils, from which brightness profiles of the individual exit pupils of the virtual retinal scan display are determined by positioning the eye-like camera at ascertained or at defined angles in the provided pupil plane of the virtual retinal scan display and by the thus oriented eye-like camera recording the projected full-area images in the exit pupils. As a result, a brightness calibration of multiple exit pupils can advantageously be made possible particularly quickly and reliably, in particular by making automation of the brightness calibration of multiple exit pupils possible. In particular, based on the captured brightness profiles (from one or more perspectives), a correction of the projection is subsequently calculated and/or performed, for example by means of the computing unit. Conventional algorithms for software correction of brightness profiles are available. An exposure time for this, in particular further, substep can be optimized by statistically evaluating the individual pixel values of images of individual exit pupils.

According to an example embodiment of the present invention, it is furthermore proposed that, in at least one, in particular additional further, substep of the calibration step, fixed focal lengths for a lens with variable refractive power in the optical path of the virtual retinal scan display are determined for the individual exit pupils of the virtual retinal scan display by the virtual retinal scan display projecting a pattern for determining the image sharpness, in particular a stripe pattern, at various set focal lengths of the lens of the virtual retinal scan display and the eye-like camera recording the pattern in the respective exit pupils. As a result, a calibration of lenses with a variable focal length for multiple exit pupils can advantageously be made possible particularly quickly and reliably, in particular by making automation of the calibration of lenses with a variable focal length for multiple exit pupils possible. In particular, a fixed focal length for a lens with variable refractive power (and thus variable focal length) is determined for each exit pupil in the, in particular additional further, substep of the method step. Such lenses may be located in the optical path of the virtual retinal scan display and are provided for compensating for path differences between the different exit pupils of the virtual retinal scan display. Based on the images of the patterns that are captured in the, in particular additional further, substep of the method step, for determining the image sharpness, contrast values are calculated, from which the focal length of the lens is subsequently determined.

According to an example embodiment of the present invention, it is also proposed that, during, before and/or after at least one substep of the calibration step, in particular during, before and/or after each substep of the calibration step, the eye-like camera is moved in such a way that a further sensor motion-connected with the eye-like camera, e.g., a light power meter, is superimposed at least with the exit pupil of the virtual retina scan display that is currently being recorded, recorded immediately afterward, and/or recorded immediately beforehand. As a result, a particularly comprehensive and/or versatile and, in particular, particularly fast and thus automatable calibration of virtual retinal scan displays, in particular of large numbers of virtual retinal scan displays, can advantageously be achieved. Advantageously, an additional safety check can be incorporated into the calibration process. As a result, a high level of safety of the virtual retinal scan display and/or of the pair of smart glasses with the virtual retinal scan display can advantageously be achieved. In addition, a performance test of the laser projector can advantageously also be incorporated in the calibration process. As a result, a high level of reliability of the virtual retinal scan display and/or of the pair of smart glasses with the virtual retinal scan display can advantageously be achieved. In particular, the light power can be determined and/or checked separately for each color, i.e., in particular for each laser diode of the laser projector (RGB).

In addition, according to an example embodiment of the present invention, a calibration device is proposed for calibrating, in an at least largely automated manner, a virtual retinal scan display for a pair of smart glasses, comprising the eye-like camera and a motorized movement unit configured for translation and/or rotation of the eye-like camera within the provided pupil plane of the virtual retinal scan display. As a result, in particular despite the complexity of the task, it can be made possible to calibrate large numbers of virtual retinal scan displays in a short time, in particular by advantageously making automation of the calibration method possible. Advantageously, a determination of different parameters of the virtual retinal scan display can be simplified, accelerated and/or automated by the calibration device according to the present invention.

According to an example embodiment of the present invention, if one or more further sensors, e.g., a light power meter, are mounted by the movement unit in a motion-connected manner with the eye-like camera, a further checking step of the virtual retinal scan display, e.g., a safety check or a performance check, can advantageously be combined with the calibration step. As a result, efficiency can advantageously be increased.

In addition, according to an example embodiment of the present invention, if the calibration device comprises a quick-change device for simply and quickly changing the virtual retinal scan display calibrated in the calibration device, calibration of the virtual retinal scan display can advantageously be simplified, accelerated, and/or automated.

Furthermore proposed according to an example embodiment of the present invention is a virtual retinal scan display, in particular in a pair of smart glasses, which virtual retinal scan display is calibrated at least by means of one of the substeps of the calibration step. As a result, an optimally calibrated and/or cost-effectively calibrated virtual retinal scan display and/or pair of smart glasses can advantageously be obtained.

The method according to the present invention, the calibration device according to the present invention and the virtual retinal scan display according to the present invention are not to be limited to the application and embodiments described above. In particular, for fulfilling a functionality described herein, the method according to the present invention, the calibration device according to the present invention and the virtual retinal scan display according to the present invention can comprise a number of individual elements, components, units, and method steps that deviates from a number mentioned herein. In addition, for the value ranges specified in this disclosure, values within the mentioned limits are also to be considered disclosed and usable as desired.

BRIEF DESCRIPTION OF THE DRAWINGS

Further advantages arise from the following description. An exemplary embodiment of the present invention is shown in the figures. The figures, the description, and the rest of the disclosure herein contain numerous features in combination. A person skilled in the art will appropriately also consider the features individually and combine them into useful further combinations.

DETAILED DESCRIPTION OF EXAMPLE EMBODIMENTS

Figure 1:
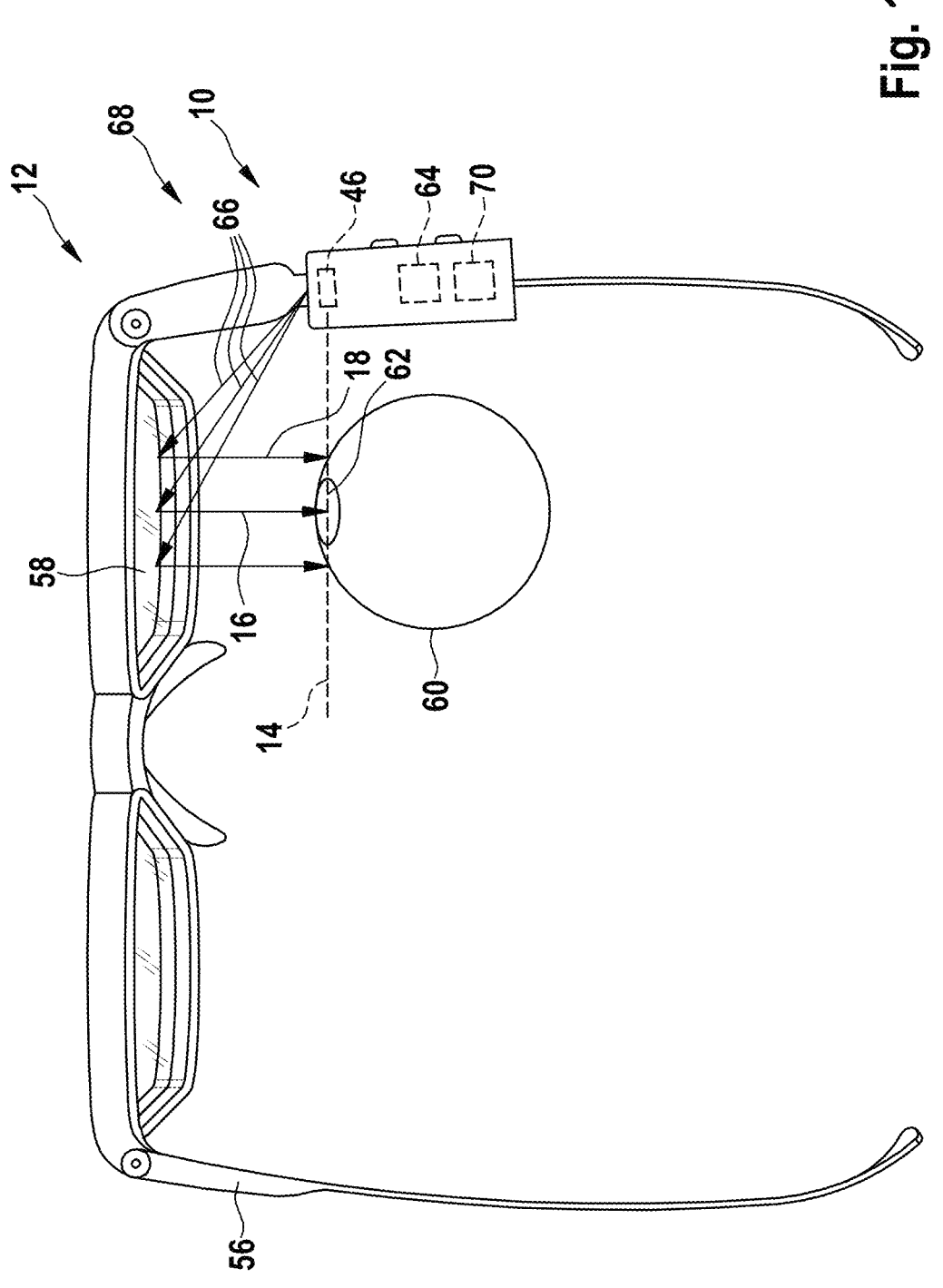
FIG. 1 shows a schematic representation of a pair of smart glasses with a virtual retinal scan display.

FIG. 1 shows a schematic representation of a pair of smart glasses 12. The pair of smart glasses 12 comprises a virtual retinal scan display 10. The pair of smart glasses 12 comprises a glasses frame 56. The pair of smart glasses 12 comprises glasses lenses 58. A user eye 60 is illustrated in FIG. 1 by way of example. The user eye 60 has a pupil 62. The pupil 62 is located in a provided pupil plane 14 of the virtual retinal scan display 10 in FIG. 1. The virtual retinal scan display 10 comprises a laser projector 64. The laser projector 64 is designed as a scanned laser projector. The laser projector 64 is provided in order to generate and output a scanned laser beam 66. The scanned laser beam 66 generates an image display of the virtual retinal scan display 10. The scanned laser beam 66 can be multiplied by an optical system 68 of the virtual retinal scan display 10 and/or by the laser projector 64 and, as a result, can output the image display in multiple spaced-apart exit pupils 16, 18 of the virtual retinal scan display 10, in particular of the optical system 68, on the pupil plane 14. The virtual retinal scan display 10 generates multiple exit pupils 16, 18 that are spaced apart from one another, without overlapping, in the provided pupil plane 14 of the virtual retinal scan display 10. In technical terms, the exit pupils 16, 18 are also referred to as eyeboxes. The laser projector 64 is at least partially integrated into the glasses frame 56. The glasses lens 58 can form a part of the virtual retinal scan display 10, for example by comprising a holographic-optical element (HOE) configured to redirect the scanned laser beam 66 and focus it into the exit pupils 16, 18 in the pupil plane 14. The optical system 68 comprises at least one lens 46. The lens 46 has a variable refractive power. The lens 46 is arranged in an optical path of the virtual retinal scan display 10. The lens 46 is configured to compensate for path differences between the individual exit pupils 16, 18 of the virtual retinal scan display 10. The virtual retinal scan display 10 comprises a computing unit 70. The computing unit 70 is provided for executing an operating program of the pair of smart glasses 12, via which at least a majority of the main functions of the pair of smart glasses 12 can preferably be executed. The virtual retinal scan display 10 in the pair of smart glasses 12 is calibrated in an at least largely automated manner. The computing unit 70 is provided for performing a calibration step 20 of the method or substeps 34, 40, 42 of the calibration step 20 (cf. also FIG. 3).

Figure 2:
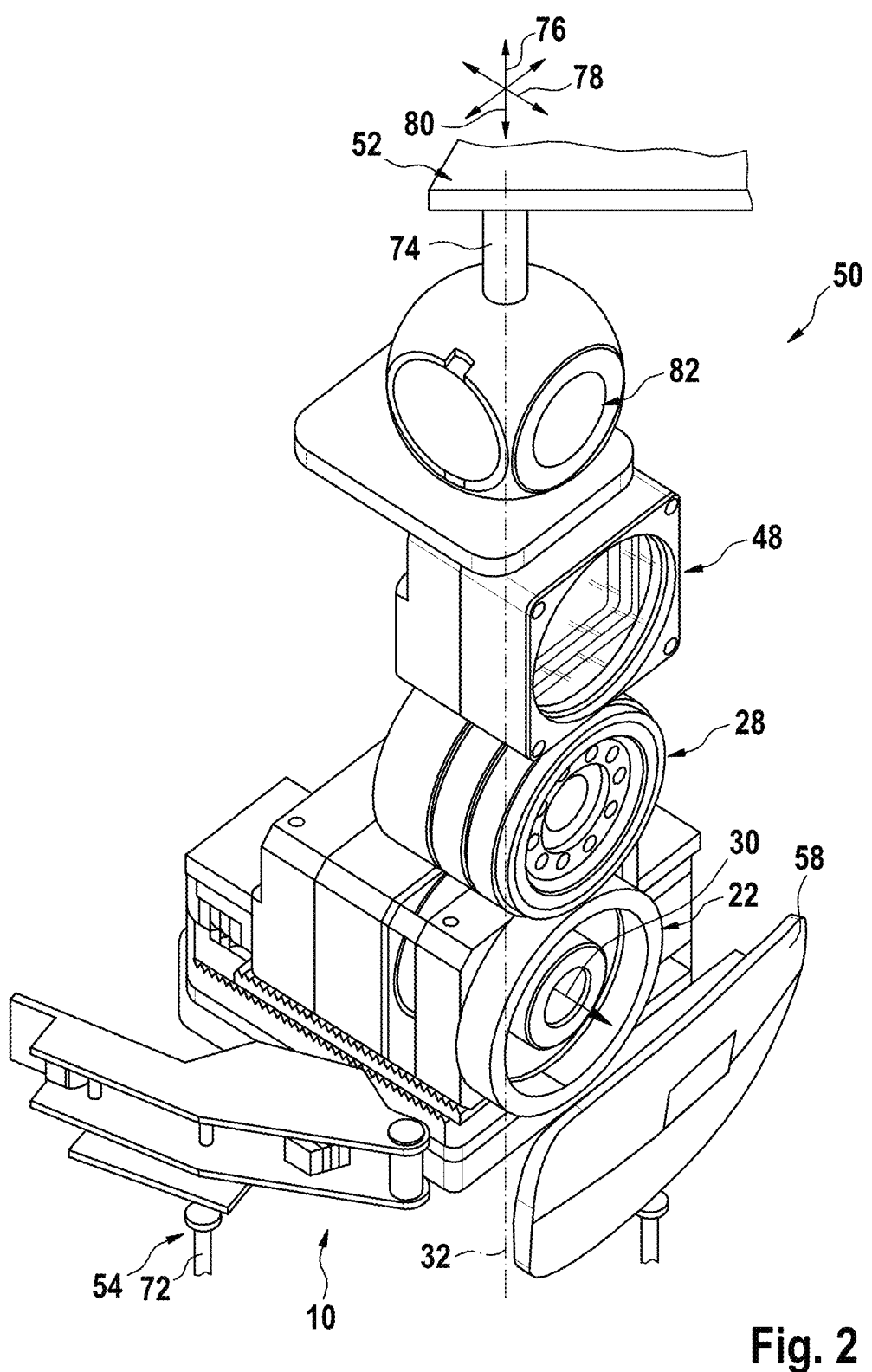
FIG. 2 shows a schematic representation of a part of a calibration device for calibrating the virtual retinal scan display, according to an example embodiment of the present invention.

FIG. 2 shows a schematic representation of a part of a calibration device 50, which is provided for calibrating, in an at least largely automated manner, the virtual retinal scan display 10 for the pair of smart glasses 12. The calibration device 50 comprises a holding device 72, shown only schematically, for the virtual retinal scan display 10, in particular for the pair of smart glasses 12. The holding device 72 holds the virtual retinal scan display 10, in particular at least the laser projector 64 and the optical system 68 with the glasses lens 58, in a fixed position. The calibration device 50 comprises a quick-change device 54, likewise shown only schematically. The quick-change device 54 may, for example, comprise an openable clamp mount or a magnetic mount. The quick-change device 54 is configured to simply and quickly change the virtual retinal scan display 10 calibrated in the calibration device 50.

The calibration device 50 comprises a further holding device 74. The further holding device 74 is translationally movable. The further holding device 74 is translationally movable along the vertical axis 76. The further holding device 74 is translationally movable along horizontal axes 78, 80. The further holding device 74 is rotatably movable about an axis of rotation 32. The calibration device 50 comprises a motorized movement unit 52, which is provided for the translation and/or the rotation of the further holding device 74 and in particular of all elements or measuring instruments held by the further holding device 74.

The calibration device 50 comprises an eye-like camera 22. The eye-like camera 22 is provided for calibrating the virtual retinal scan display 10 held in the holding device 72. The eye-like camera 22 has an angle of view that is similar to that of the human eye. The eye-like camera 22 has an optical function equal to that of the human eye. The eye-like camera 22 is held at least indirectly by the further holding device 74. The eye-like camera 22 is translatable and/or rotatable by the movement unit 52. The eye-like camera 22 can be moved by the movement unit 52 into the provided pupil plane 14 of the virtual retinal scan display 10 held in the holding device 72. The eye-like camera 22 is translatable and/or rotatable by the movement unit 52 within the provided pupil plane 14 of the virtual retinal scan display 10 held in the holding device 72.

The calibration device 50 comprises multiple further optical sensors 28, 48. A first further sensor 48 is designed as a light power meter. A second further sensor 28 is designed as a beam profiler. Alternatively, the second further sensor 28 could also be designed as a telecentric camera. The second further sensor 28 is provided for capturing an entire projection area of the virtual retinal scan display 10, in particular also in the pupil plane 14. The second further sensor 28 is provided for capturing all exit pupils 16, 18 of the virtual retinal scan display 10 in the pupil plane 14. At least one or all of the further sensors 28, 48 are mounted by the movement unit 52 in a motion-connected manner with the eye-like camera 22 and/or with the respective other further sensors 28, 48. The calibration device 50 comprises an artificial eye 82. The artificial eye 82 is provided at least to generate a reflection of the light radiated by the virtual retinal scan display 10, which is at least substantially equal to that of a real human eye, in particular a real human retina and/or a true human cornea. The artificial eye 82 is mounted by the movement unit 52 in a motion-connected manner with the eye-like camera 22 and/or with the further sensors 28, 48. The movement unit 52 is provided to selectively bring the eye-like camera 22, the further sensors 28, 48 and the artificial eye 82 into overlap with at least one single exit pupil 16, 18 of the virtual retinal scan display 10.

Figure 3:
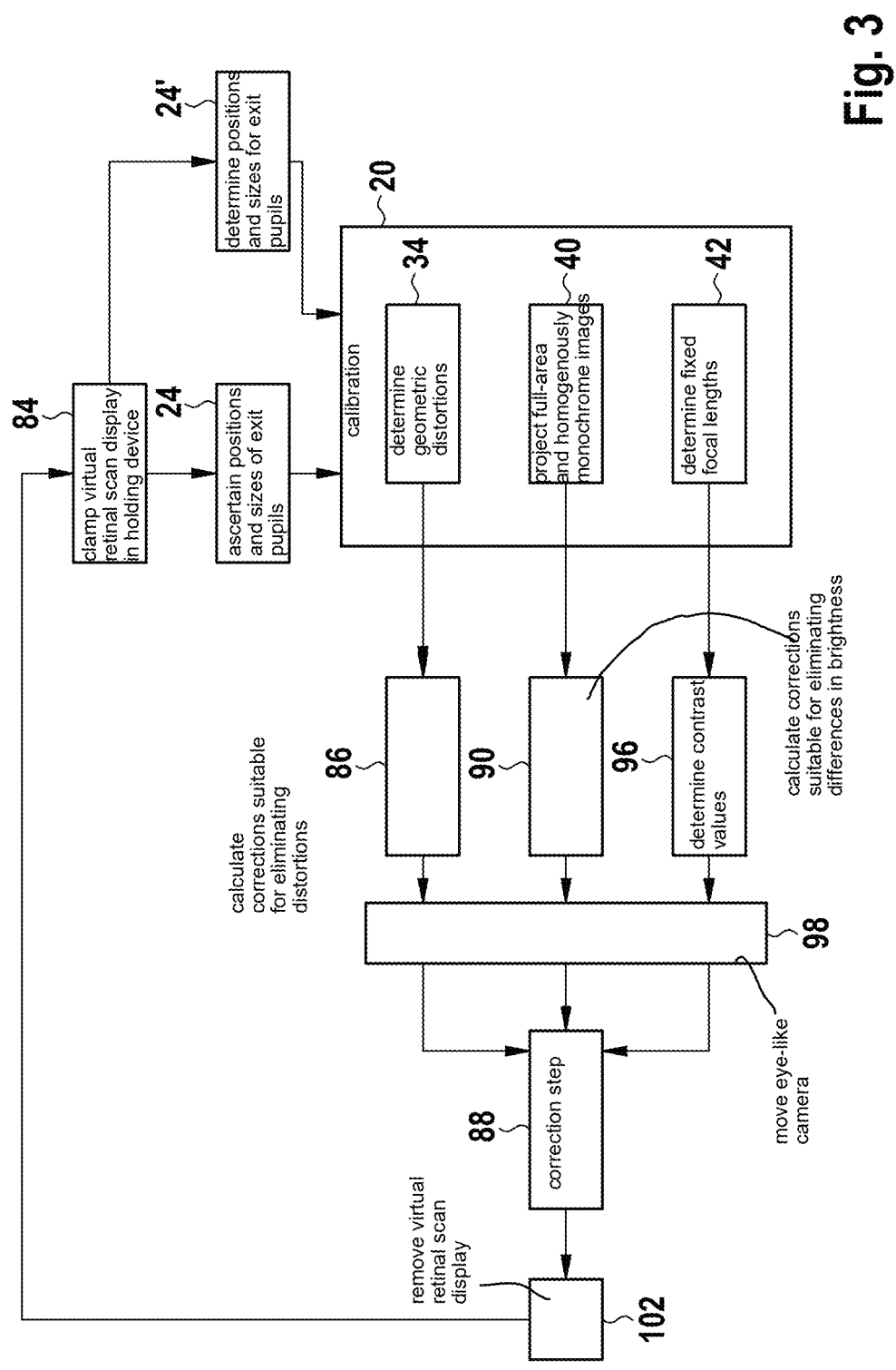
FIG. 3 shows a schematic flow diagram of a method for calibrating the virtual retinal scan display, according to an example embodiment of the present invention.

FIG. 3 shows a schematic flow diagram of a method for calibrating, in an at least largely automated manner, the virtual retinal scan display 10 for a pair of smart glasses 12. In at least one method step 84, the virtual retinal scan display 10 is clamped in the holding device 72. Clamping of the virtual retinal scan display 10 in the holding device 72 can be accomplished by means of the quick-change device 54. In at least one method step 24, the positions and the sizes of the exit pupils 16, 18 of the virtual retinal scan display 10 are ascertained by moving the eye-like camera 22 by means of the movement unit 52 over the entire projection area of the virtual retinal scan display 10 (cf. also FIG. 4) and determining the position of the respective exit pupil 16, 18 in a coordinate system of the eye-like camera 22 by sequentially recording test patterns 26 (cf. also FIGS. 6A to 6C) from each exit pupil 16, 18. In the method step 24, the eye-like camera 22 can optionally be rotated about the axis of rotation 32 extending at least substantially perpendicularly to a main viewing direction 30 of the eye-like camera 22 so that different angular orientations of the eye-like camera 22 are scanned. In a method step 24', which is alternative to method step 24 and pursues the same goal, the positions and the sizes of the exit pupils 16, 18 of the virtual retinal scan display 10 are determined by simultaneously recording the entire projection area of the virtual retinal scan display 10 by means of the first further optical sensor 28. The evaluation of the images of the eye-like camera 22 or of the further sensor 28 for ascertaining the positions and the sizes of the exit pupils 16, 18 can in each case be performed by the computing unit 70 or by an external system communicatively connected to the virtual retinal scan display 10.

In at least one calibration step 20 of the method following the method step 24, 24', the eye-like camera 22 is automatically translated and/or rotated in the provided pupil plane 14 of the virtual retinal scan display 10 in such a way that all exit pupils 16, 18 of the virtual retinal scan display 10 are each sequentially captured from different positions and angles of the eye-like camera 22. When sequentially capturing the exit pupils 16, 18, only a single exit pupil 16, 18 of the virtual retinal scan display 10 is captured by the eye-like camera 22 during the calibration step 20.

In at least one substep 34 of the calibration step 20, geometric distortions of the individual exit pupils 16, 18 of the virtual retinal scan display 10 are determined by positioning the eye-like camera 22 at ascertained or at defined positions and angles in the provided pupil plane 14 of the virtual retinal scan display 10 and by the thus oriented eye-like camera 22 recording test patterns 26 projected into the exit pupils 16, 18. The test patterns 26 projected by the virtual retinal scan display 10 into the exit pupils 16, 18 are optionally digitally composed of individual partial patterns 36, 38 projected in chronological succession by the virtual retinal scan display 10 and recorded in chronological succession by the eye-like camera 22. In at least one further method step 86, the recorded test patterns 26 from the individual exit pupils 16, 18 are used by the computing unit 70 to calculate corrections which are suitable for eliminating the geometric distortions. The corrections of the geometric distortions are sent to the controller of the laser projector 64. In at least one correction step 88, the controller of the laser projector 64 applies the corrections in order to optimize the output of the virtual retinal scan display 10. This correction step 88 can be part of normal operation of the pair of smart glasses 12.

In at least one further substep 40 of the calibration step 20, full-area and homogeneously monochrome images are projected into the exit pupils 16, 18. Brightness profiles 94 of the individual exit pupils 16, 18 of the virtual retinal scan display 10 are determined from the full-area and homogeneously monochrome images by positioning the eye-like camera 22 at ascertained or at defined angles in the provided pupil plane 14 of the virtual retinal scan display 10 and by the thus oriented eye-like camera 22 recording the projected full-area images in the exit pupils 16, 18 (cf. FIG. 7). In at least one further method step 90, the recorded images from the individual exit pupils 16, 18 are used by the computing unit 70 to calculate corrections which are suitable for eliminating differences in brightness between exit pupils 16, 18 or within an exit pupil 16, 18. The corrections of the brightness profiles 94 are sent to the controller of the laser projector 64. In the correction step 88, the controller of the laser projector 64 applies the corrections in order to optimize the output of the virtual retinal scan display 10.

In at least one additional further substep 42 of the calibration step 20, fixed focal lengths for the lens 46 with the variable refractive power in the optical path of the virtual retinal scan display 10 are determined for the individual exit pupils 16, 18 of the virtual retinal scan display 10. For this purpose, a pattern 44, in particular a stripe pattern, for determining the image sharpness (cf. FIGS. 8A to 8C) at various set focal lengths of the lens 46 of the virtual retinal scan display 10 is projected by the virtual retinal scan display 10 in the substep 42. This projected pattern 44 is subsequently recorded by the eye-like camera 22 in the respective exit pupils 16, 18. In at least one further method step 96, contrast values are determined on the basis of the recorded patterns 44 from the individual exit pupils 16, 18 by means of the computing unit 70 and are evaluated in order to ascertain the fixed focal lengths. The image of maximum sharpness is searched for in each case. The determined focal lengths for the respective exit pupils 16, 18 are sent to the controller of the laser projector 64. In the correction step 88, the controller of the laser projector 64 applies the thus determined measured values in order to optimize the output of the virtual retinal scan display 10.

In at least one further method step 98, the eye-like camera 22 is moved in such a way that one of the further sensors 28, 48, motion-connected with the eye-like camera 22, or the artificial eye 82 is superposed with a recorded exit pupil 16, 18 of the virtual retinal scan display 10. In the method step 98, an additional measurement is carried out in direct connection with the calibration of the virtual retinal scan display 10. The method step 98 can be performed during, before or after at least one or each of the substeps 34, 40, 42 of the calibration step 20. In at least one further method step 102, the virtual retinal scan display 10 is removed from the calibration device 50 and another virtual retinal scan display 10 is clamped into the calibration device 50.

Figure 4:
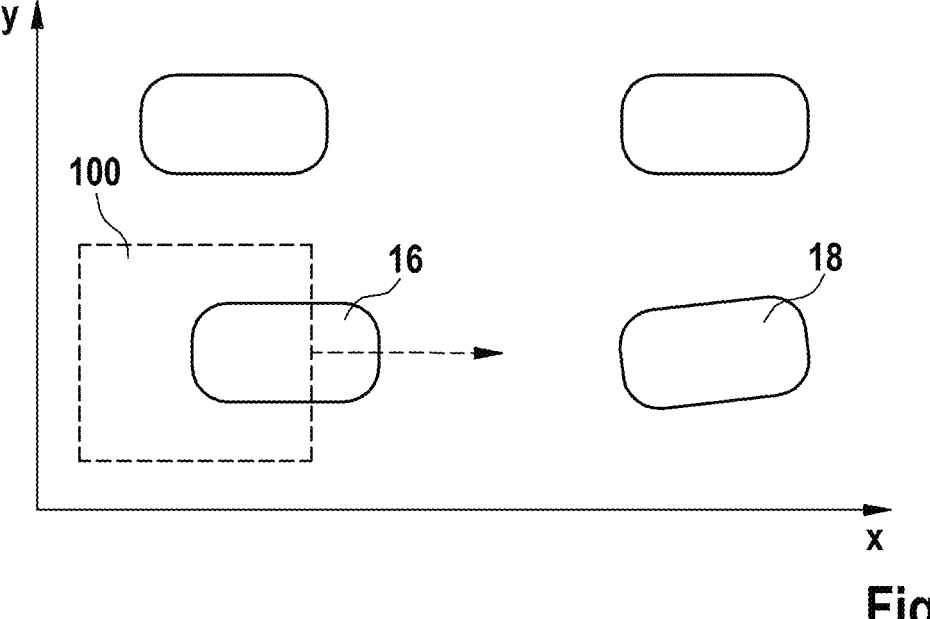
FIG. 4 shows schematically, a portion of a projection area of the virtual retinal scan display with multiple exit pupils of the virtual retinal scan display, according to an example embodiment of the present invention.
Figure 5:
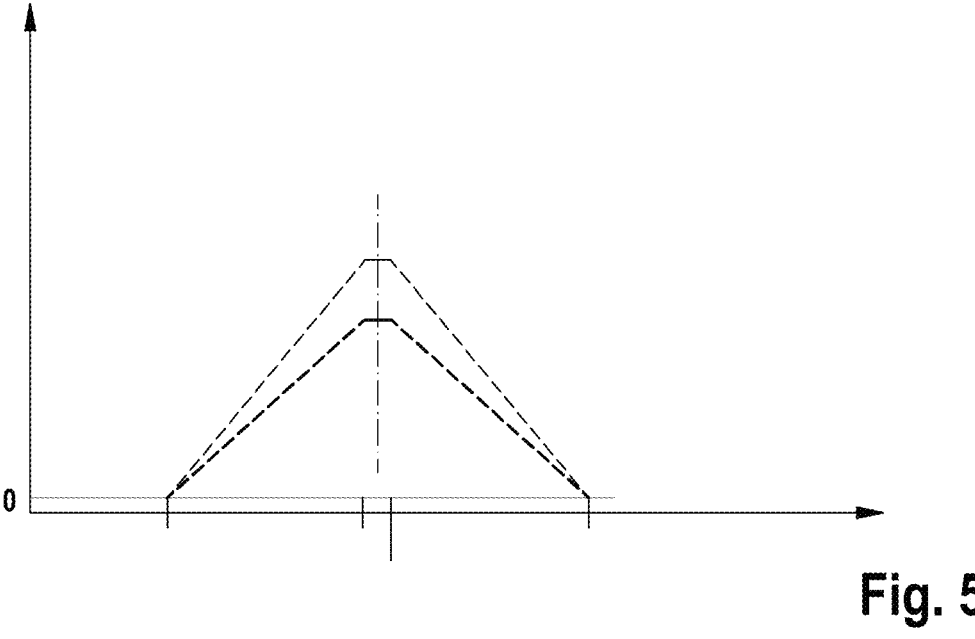
FIG. 5 shows schematically, a curve with a number of bright pixels within a field of view of an eye-like camera while moving over one of the exit pupils.

FIG. 4 schematically shows a part of the projection area of the virtual retinal scan display 10 in the pupil plane 14 with multiple exit pupils 16, 18. Also schematically shown in FIG. 4 is a field of view 100 of the eye-like camera 22. The field of view 100 of the eye-like camera 22 is moved in strips over the entire projection area of the virtual retinal scan display 10 in the method step 24 so that all possible exit pupils 16, 18 of the virtual retinal scan display 10 can be scanned. FIG. 5 shows, by way of example and schematically, a number of bright pixels within the field of view 100 of the eye-like camera 22 while moving over an exit pupil 16, 18. The course of the curve of the number of bright pixels can be used to ascertain a pixel width of the exit pupil 16, 18 and, with appropriate conversion, a real width of the exit pupil 16, 18.

Figure 6A:
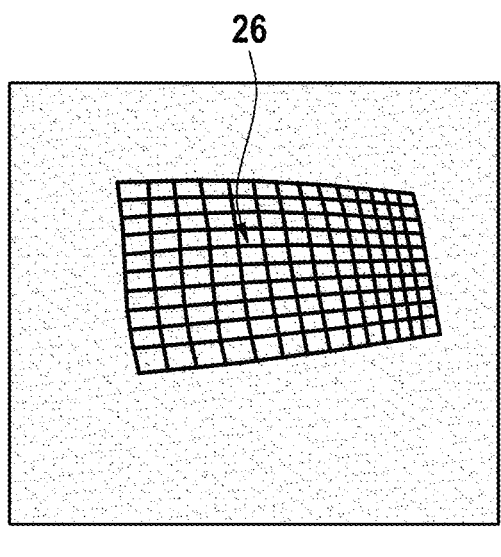
FIG. 6A shows schematically, a digitally composed test pattern as used in a substep of a calibration step of the method, according to an example embodiment of the present invention.
Figure 6B:
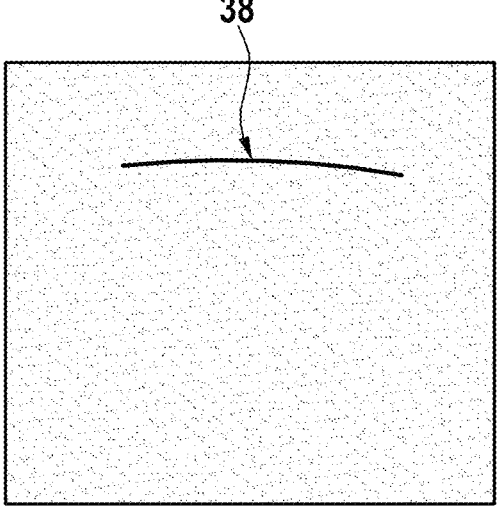
FIG. 6B shows a single partial pattern of the test pattern.
Figure 6C:
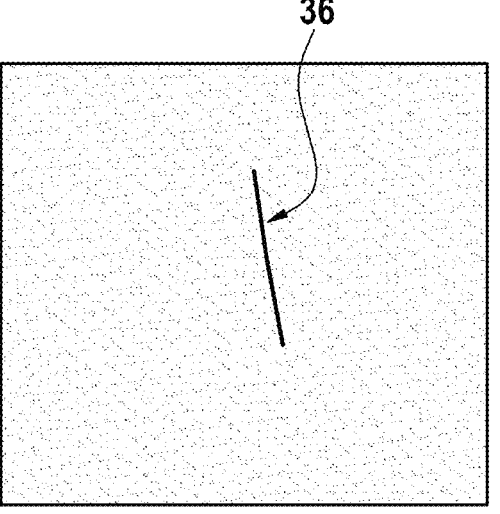
FIG. 6C shows a further single partial pattern of the test pattern.

FIG. 6A shows, by way of example and schematically, the test pattern 26 as used in the substep 34 of the calibration step 20. FIG. 6A shows the test pattern 26 already assembled into a grid. FIGS. 6B and 6C, on the other hand, each show partial patterns 36, 38 of the test pattern 26 as they are projected sequentially one after the other into the exit pupils 16, 18.

Figure 7:
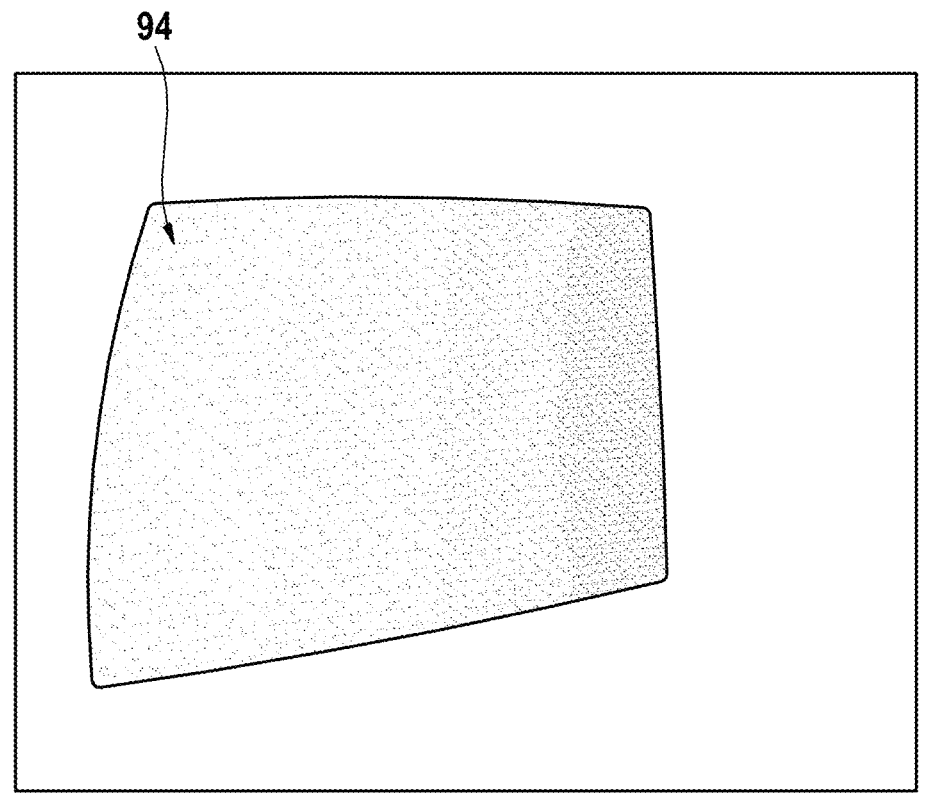
FIG. 7 shows schematically and by way of example, a brightness profile as used in a further substep of the calibration step of the method.

FIG. 7 shows, by way of example and schematically, the brightness profile 94 as projected into the exit pupils 16, 18 in the further substep 40 of the calibration step 20. The computing unit 70 also automatically determines an optimal exposure time.

Figure 8A:
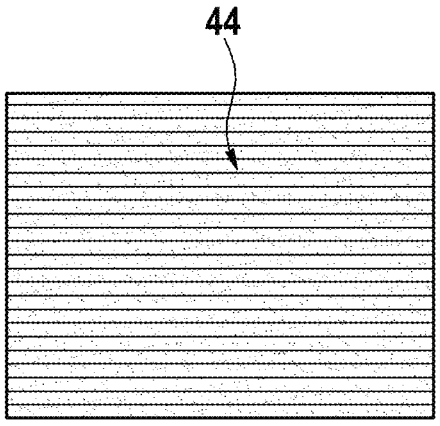
FIG. 8A shows schematically, a pattern as used in an additional further substep of the calibration step at a first set focal length of a lens of the virtual retinal scan display, according to an example embodiment of the present invention.
Figure 8B:
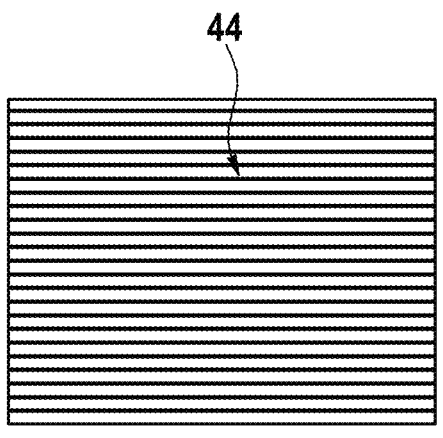
FIG. 8B shows schematically, a pattern as used in an additional further substep of the calibration step at a second set focal length of the lens of the virtual retinal scan display, according to an example embodiment of the present invention.
Figure 8C:
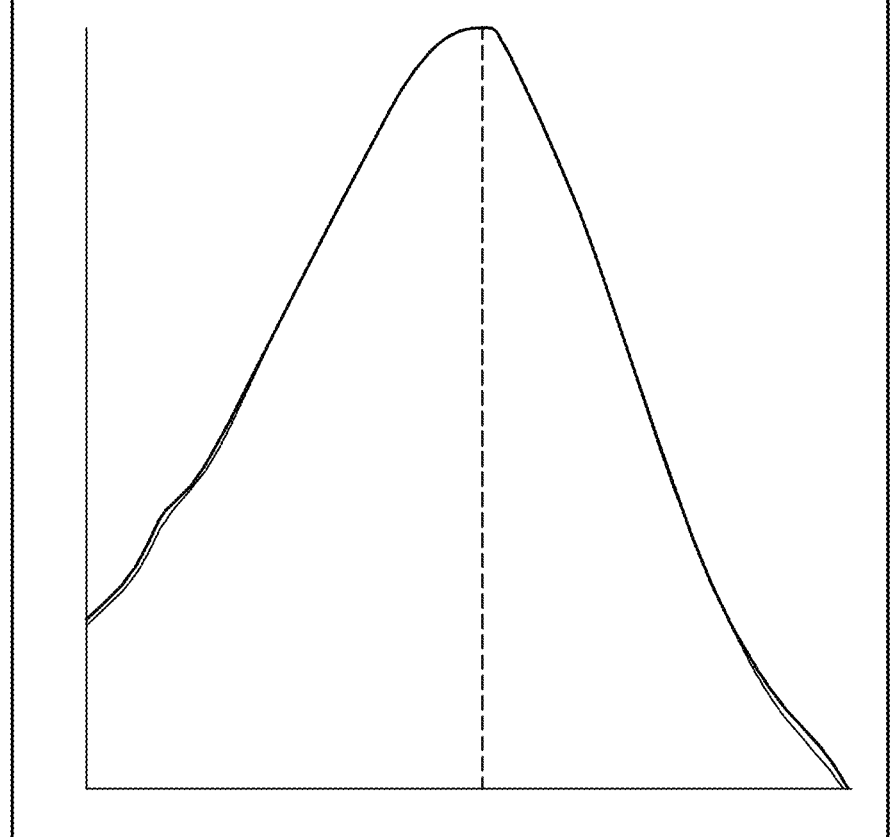
FIG. 8C shows schematically, a curve illustrating a contrast value over various set focal lengths of the lens.

FIGS. 8A and 8B show, by way of example and schematically, the pattern 44 as used in the additional further substep 42 of the calibration step 20 at various set focal lengths of the lens 46. FIG. 8C shows, by way of example and schematically, a contrast value over various set focal lengths of the lens 46. The course of the curve is used to determine a maximum value which corresponds to a maximum contrast and thereby determines the focal length setting with the maximum contrast value for the respective exit pupil 16, 18.

The invention claimed is:

1. A method for calibrating, in an at least largely automated manner, a virtual retinal scan display for a pair of smart glasses including multiple exit pupils that are spaced apart from one another without overlapping, in a provided pupil plane of the virtual retinal scan display, the method comprising the following steps:

in at least one calibration step, automatically translating and/or rotating an eye-like camera in the provided pupil plane of the virtual retinal scan display in such a way that at least two exit pupils of the virtual retinal scan display are each sequentially captured from different positions and/or angles of the eye-like camera, wherein, in at least one method step chronologically preceding the calibration step, positions and/or sizes of the exit pupils of the virtual retinal scan display are ascertained by moving the eye-like camera over an entire projection area of the virtual retinal scan display and determining the position of each the exit pupils in a coordinate system of the eye-like camera: (i) by sequentially recording test patterns from each of the exit pupils, or (ii) by simultaneously recording the entire projection area of the virtual retinal scan display using a further optical sensor including a further camera with a large angle of view or a beam profiler or a telecentric camera.

2. The method according to claim 1, wherein the eye-like camera has an angle of view and an optical function that are at least substantially equal to those of a human eye, and only a single exit pupil of the virtual retinal scan display is captured by the eye-like camera during the calibration step.

3. The method according to claim 1, wherein in the method step chronologically preceding the calibration step, the eye-like camera is rotated about an axis of rotation extending at least substantially perpendicularly to a main viewing direction of the eye-like camera, so that different angular orientations of the eye-like camera are scanned.

4. The method according to claim 1, wherein, in at least one substep of the calibration step, geometric distortions of the exit pupils of the virtual retinal scan display are determined by positioning the eye-like camera at ascertained or at defined positions and angles in the provided pupil plane of the virtual retinal scan display and by the positioned eye-like camera recording test patterns projected into the exit pupils.

5. A method for calibrating, in an at least largely auto-mated manner, a virtual retinal scan display for a pair of smart glasses including multiple exit pupils that are spaced apart from one another without overlapping, in a provided pupil plane of the virtual retinal scan display, the method comprising the following steps:

in at least one calibration step, automatically translating and/or rotating an eye-like camera in the provided pupil plane of the virtual retinal scan display in such a way that at least two exit pupils of the virtual retinal scan display are each sequentially captured from different positions and/or angles of the eye-like camera, wherein, in at least one substep of the calibration step, geometric distortions of the exit pupils of the virtual retinal scan display are determined by positioning the eye-like camera at ascertained or at defined positions and angles in the provided pupil plane of the virtual retinal scan display and by the positioned eye-like camera recording test patterns projected into the exit pupils, and wherein the test patterns projected by the virtual retinal scan display into the exit pupils are composed, digi-tally, of individual partial patterns projected in chrono-logical succession by the virtual retinal scan display and recorded in chronological succession by the eye-like camera.

6. A method for calibrating, in an at least largely auto-mated manner, a virtual retinal scan display for a pair of smart glasses including multiple exit pupils that are spaced apart from one another without overlapping, in a provided pupil plane of the virtual retinal scan display, the method comprising the following steps:

in at least one calibration step, automatically translating and/or rotating an eye-like camera in the provided pupil plane of the virtual retinal scan display in such a way that at least two exit pupils of the virtual retinal scan display are each sequentially captured from different positions and/or angles of the eye-like camera, wherein, in at least one substep of the calibration step, full-area, homogeneously monochrome, images are projected into the exit pupils, from which brightness profiles of the exit pupils of the virtual retinal scan display are determined by positioning the eye-like camera at ascertained or at defined angles in the pro-vided pupil plane of the virtual retinal scan display and by the positioned eye-like camera recording the pro-jected full-area images in the exit pupils.

7. The method according to claim 1, wherein, in at least one substep of the calibration step, fixed focal lengths for a lens with a variable refractive power in an optical path of the virtual retinal scan display are determined for the exit pupils of the virtual retinal scan display by the virtual retinal scan display projecting a pattern for determining an image sharp-ness including a stripe pattern, at various set focal lengths of the lens of the virtual retinal scan display and by the eye-like camera recording the pattern in the exit pupils.

8. A method for calibrating, in an at least largely auto-mated manner, a virtual retinal scan display for a pair of smart glasses including multiple exit pupils that are spaced apart from one another without overlapping, in a provided pupil plane of the virtual retinal scan display, the method comprising the following steps:

in at least one calibration step, automatically translating and/or rotating an eye-like camera in the provided pupil plane of the virtual retinal scan display in such a way that at least two exit pupils of the virtual retinal scan display are each sequentially captured from different positions and/or angles of the eye-like camera, wherein, before and/or after at least one substep of the calibration step, the eye-like camera is moved in such a way that a further sensor motion-connected with the eye-like camera is superimposed at least with an exit pupil of the virtual retina scan display that is: (i) currently recorded, and/or (ii) recorded immediately afterward, and/or recorded immediately beforehand.

9. A calibration device configured to calibrate, in an at least largely automated manner, a virtual retinal scan display for a pair of smart glasses including multiple exit pupils that are spaced apart from one another without overlapping, in a provided pupil plane of the virtual retinal scan display, the calibration device comprising:

an eye-like camera adapted for translation and/or rotation within the provided pupil plane of the virtual retinal scan display, by a motorized movement unit; and one or more further sensors mounted in a motion-con-nected manner with the eye-like camera, wherein the calibration device is configured to:

automatically translate and/or rotate the eye-like cam-era in the provided pupil plane of the virtual retinal scan display in such a way that at least two exit pupils of the virtual retinal scan display are each sequentially captured from different positions and/or angles of the eye-like camera.

10. A calibration device configured to calibrate, in an at least largely automated manner, a virtual retinal scan display for a pair of smart glasses including multiple exit pupils that are spaced apart from one another without overlapping, in a provided pupil plane of the virtual retinal scan display, the calibration device comprising:

an eye-like camera adapted for translation and/or rotation within the provided pupil plane of the virtual retinal scan display, by a motorized movement unit; and a quick-change device for simply and quickly changing the virtual retinal scan display calibrated in the cali-bration device, wherein the calibration device is configured to:

automatically translate and/or rotate the eye-like camera in the provided pupil plane of the virtual retinal scan display in such a way that at least two exit pupils of the virtual retinal scan display are each sequentially cap-tured from different positions and/or angles of the eye-like camera.

\* \* \* \* \*